Inventors
HARVEY C. HAYES
PRESCOTT N. ARNOLD

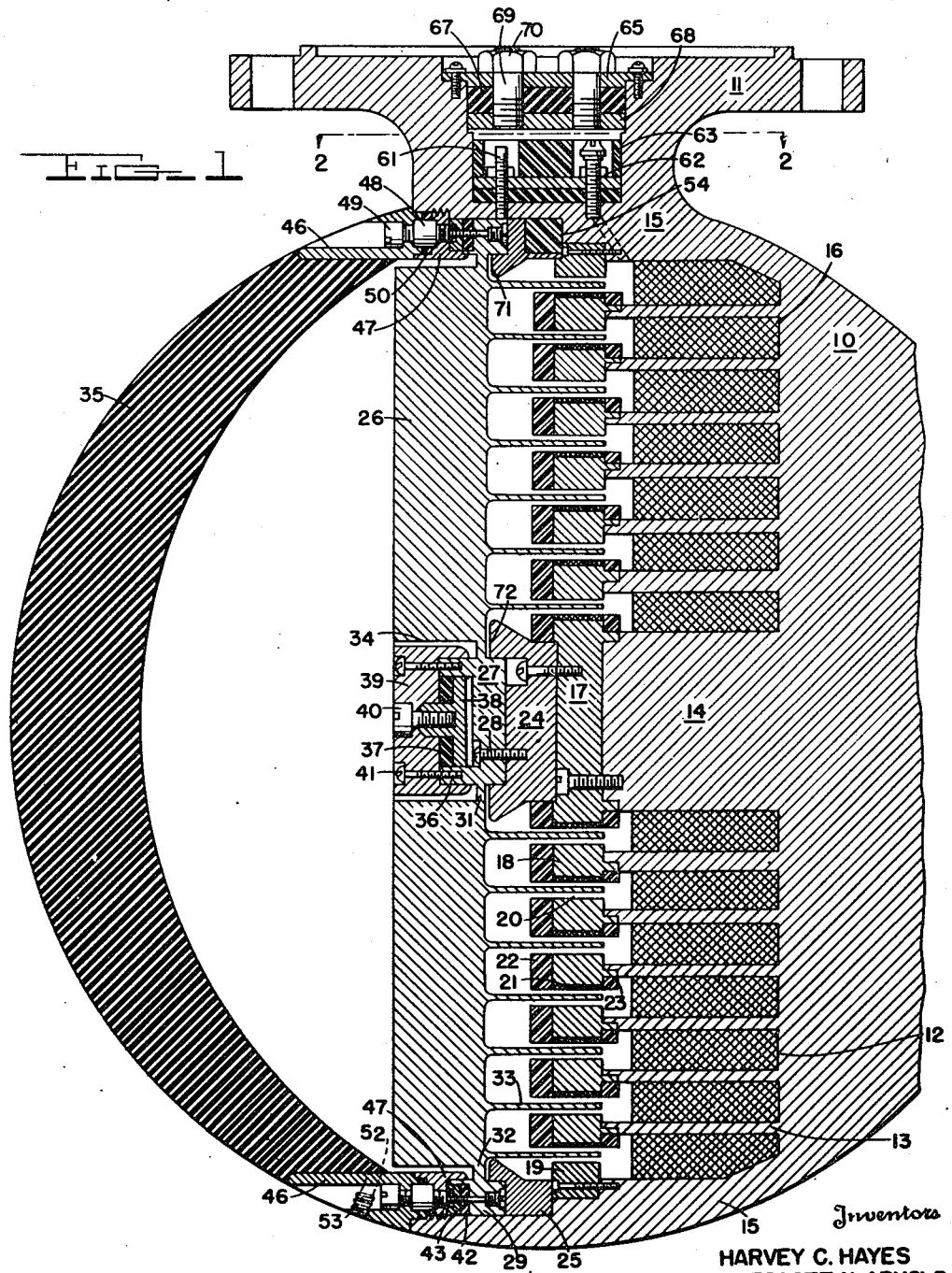

July 24, 1951  H. C. HAYES ET AL  2,561,368
ELECTROMAGNETIC UNDERWATER SOUND PROJECTOR AND RECEIVER
Filed Jan. 9, 1946  5 Sheets-Sheet 3
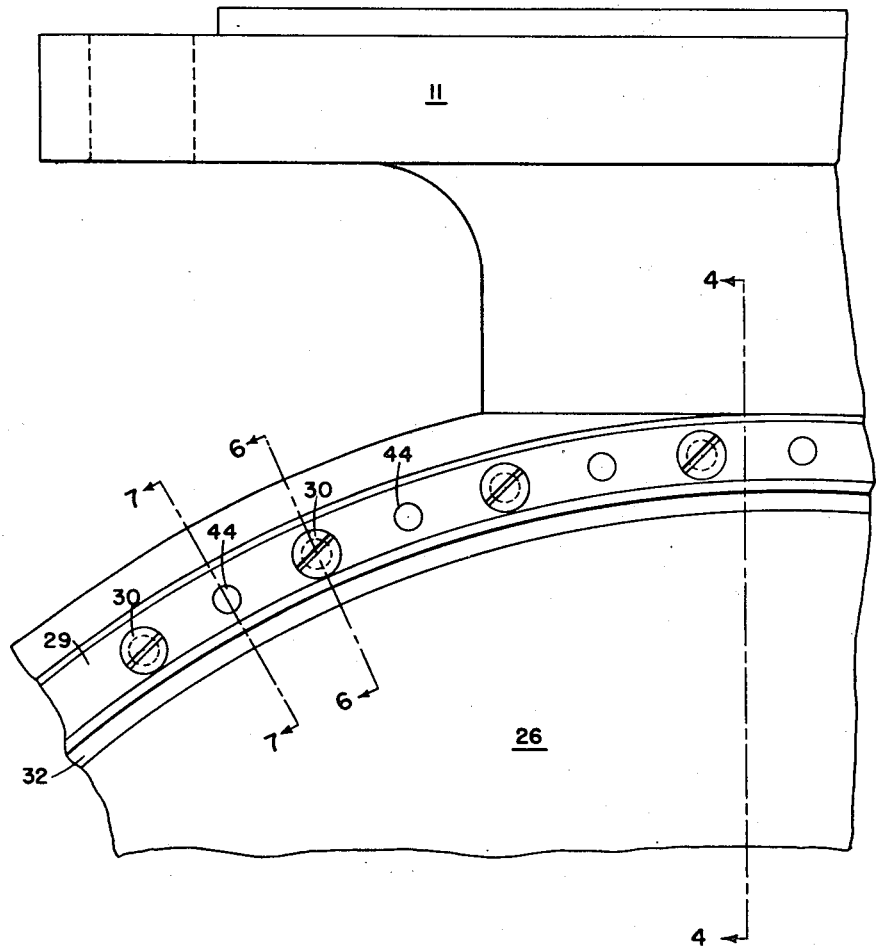
Inventors
HARVEY C. HAYES
PRESCOTT N. ARNOLD
By
Attorney

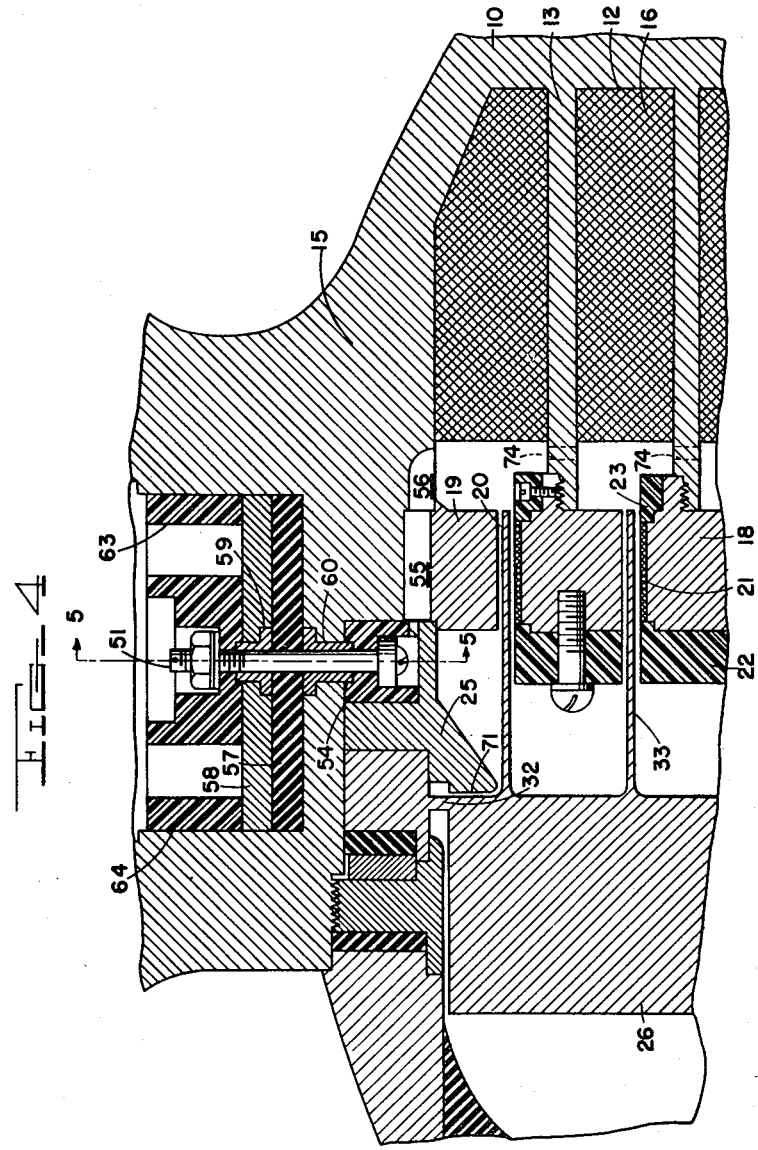

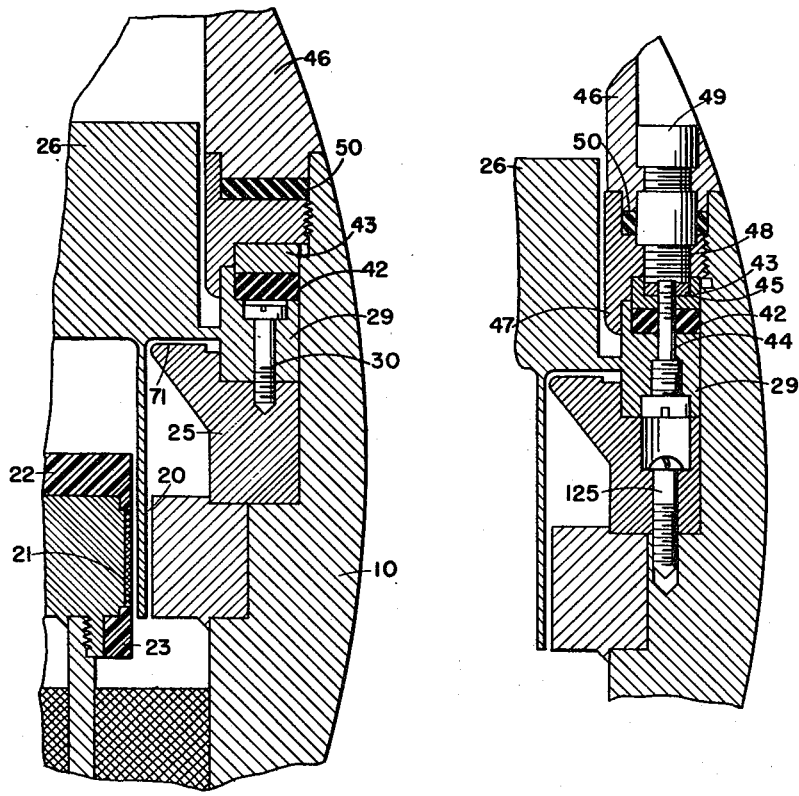

Patented July 24, 1951

2,561,368

UNITED STATES PATENT OFFICE 2,561,368

ELECTROMAGNETIC UNDERWATER SOUND PROJECTOR AND RECEIVER

Harvey C. Hayes, Washington, D. C., and Prescott N. Arnold, Bethesda, Md.

Application January 9, 1946, Serial No. 640,022

4 Claims. (Cl. 177—386)

(Granted under the act of March 3, 1883, as amended April 30, 1928; 370 O. G. 757)

The present invention relates to electrodynamic transducers and more particularly to an underwater sound projector and receiver.

An object of the invention is to provide an electrodynamic transducer of relatively large effective diaphragm area and capable of operating at supersonic frequencies.

Another object is the provision of an electrosonic transducer capable of effective operation as an underwater projector and microphone, in sea water, and resonant at a supersonic frequency with a high conversion efficiency.

Another object is the provision of a high power highly directional supersonic transducer.

Another object is to provide an electromagnetic supersonic transducer of higher power-handling capacity than the usual magnetostriction transducer, and of lower impedance than the usual piezoelectric crystal transducer.

Another object is the provision of a simple and effective mechanical coupling between driving and driven parts whereby a desired transformation from high vibrational amplitude to low vibrational amplitude and vice versa may be obtained with maximum simplicity of structure.

A further object is the provision of an underwater electrosonic transducer which shall be waterproof, and mechanically sturdy.

Various other objects and advantages of the invention will become apparent upon a perusal of the following description and the drawings accompanying the same.

In the drawings:

Fig. 1 is a section through the training axis of a projector-receiver embodying the invention, the section being taken along a plane normal to the vibrating face or diaphragm.

Figure 3:
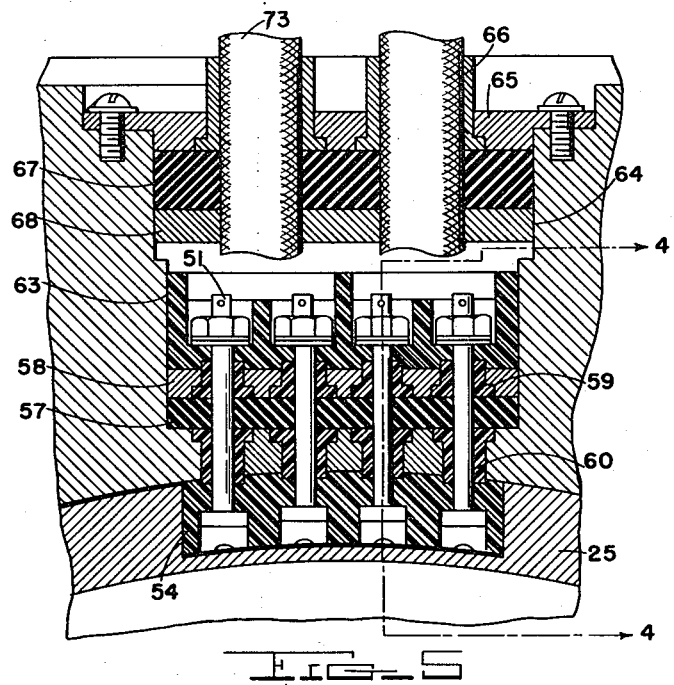

Fig. 3 is an enlarged fragmentary front view looking from the left of Fig. 1 with the sound window 35, mounting ring 47, compression ring 43 and gasket 42 removed.

Figure 2:
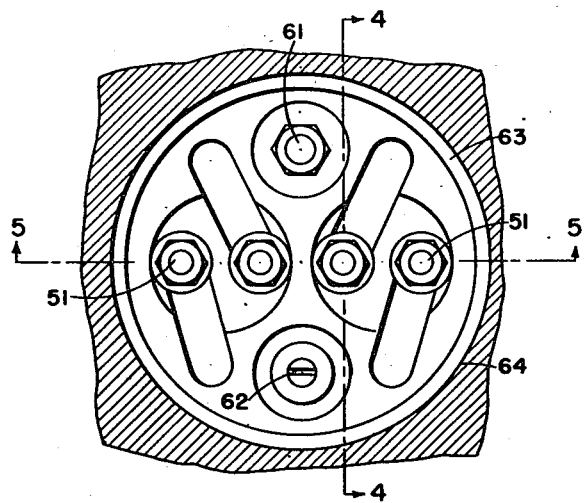
Fig. 2 is a section on line 2—2 of Fig. 1 and on an enlarged scale.

Fig. 4 is a section on line 4—4 of Figs. 2 and 5.

Fig. 5 is a section on line 5—5 of Figs. 2 and 4.

Fig. 6 is a fragmentary sectional view on line 6—6 of Fig. 3.

Fig. 7 is a fragmentary section on the line 7—7 of Fig. 3.

Referring to the drawings in detail, the main body portion of the device is comprised of the casing 10 with integral, attaching flange 11, of magnetic material, in the present instance cast electromagnetic iron of the type known as "Armco." A series of seven annular grooves or winding slots 12, concentric and spaced radially, form between them a series of six annular concentric core elements 13, having a central core element 14 and a peripheral core element 15. These core elements form a composite core for a polarizing or biasing, steady, magnetic-field component, energized by a series of seven field windings 16. The windings 16 may be of any known or other suitable form and in the present instance are of the usual pre-formed type, impregnated taped and nested snugly in their respective slots, each winding containing approximately 385 turns of number 14, single "fiberglas" covered, enameled, copper wire, the whole taped with "fiberglas" tape.

A central pole piece 17 secured to the central core element 14, and six concentric annular pole pieces 18 secured one to the end of each of the annular core elements 13, together with a peripheral pole piece 19 secured to the inner face of the peripheral core element 15, form between them a series of seven concentric annular magnetic circuit gaps 20. Each of the pole pieces, except the outermost or peripheral pole piece 19, has mounted on its outer annular face and therefore within the gap between it and the next outer pole piece, a signal input-output coil 21 held in an annular groove whose bottom is formed by the outer face of the pole piece and whose sides are formed by front and rear rings 22 and 23 of insulating material such as Bakelite secured to their respective pole pieces. In the present instance, the signal coils 21 are comprised each of about 17 turns of number 18 single "fiberglas" covered, enameled wire.

A central spacing disk 24 of nonmagnetic material mounted on the central pole piece 17, and a peripheral mounting ring 25 secured by a circular series of bolts, one of which is shown in Fig. 7 at 125, on to a ledge within the outer wall portion forming the peripheral core element, serve to support the vibrating diaphragm or zone plate 26. The zone plate 26 is preferably of light, strong material, in the present instance, Duralumin. The plate 26 is compliantly supported at the center through an integral central portion 27 rigidly secured to the central mounting disk by means of a circular series of screws one of which 28 is shown, and at the periphery through an integral mounting rim 29 rigidly secured to the mounting ring 25 by means of circular series of screws, one of which 30 is shown in Fig. 6. Relatively thin, integral, annular, flexible portions 31 and 32 connect the main body portion of the plate 26 with the central portion 27 and mounting rim 29 respectively. Extending from the rear face of the vibratory plate 26 in a direction normal to the plate are a plurality of concentric cylindrical flanges 33 of electrical conducting material, in the present instance Duralumin and integral with the plate. These flanges extend back into the annular field gaps 20 and are given a total length, from the rear face of the plate to the free end of the flange, of approximately a quarter wavelength of the compressional waves to be produced, as propagated through the material of the flanges. The plate being of a mass several times that of the flanges brings about between the two, at resonance, a mechanical transformer action whereby a flange movement at the free end of relatively high amplitude, low force, will be transformed into a plate movement of relatively low amplitude but high force, and conversely a plate movement of relatively high force, low amplitude will be transformed into a flange movement, at the free end of the flange, of relatively low force but high amplitude. To substantially equalize the mechanical coupling between plate and flanges, the latter are spaced radially at substantially equal intervals from the center so that each driving flange is assigned a different annular zone of the plate, each flange being connected to its zone at the radial center of mass of that zone. Also the mass ratio is made substantially the same for each flange and its zone. In the case of the innermost flange, the spacing from center is greater than the interval between adjacent flanges, but this is compensated for by reduction of the amount of plate-material near the center of the plate constituting the zone driven by the centermost flange. In the present instance, this reduction is accomplished by forming at the center of the plate the deep countersunk portion 34 leaving the thinned flexible annular connection 31 between the plate and the central, plate-portion 27. There is thus assigned to the innermost flange an annular portion of the plate, of a radial thickness substantially equal to that of the other similar portions similarly related to the other flanges.

To isolate the front interior portion of the device from the surrounding medium in which it is to be used, the front portion is closed by a hemispherical window element 35 of sound-transparent material, in the present instance sound-rubber, the space between which and the plate 26 being filled with a suitable sound transmitting liquid of substantially the same acoustic qualities as sea water, for example castor oil, not shown. To seal off from the body of oil, the central portion 27 of the vibratory plate pierced by the bolts 28 securing it to the spacing disk 24, the portion 27 is provided with a cylindrical extension 36 into which is fitted a rubber packing ring 37 arranged to be compressed between a compression plate 38 and a metal cap element 39 by means of a cap-screw bolt 40. The cap element 39 is held in place on the top of the cylindrical extension 36 through countersunk screws 41.

To prevent leakage of oil from the front of the device to the rear interior, around the periphery of the vibrating plate 26, the plate mounting rim 29 is provided with an axially outwardly, and radially outwardly, facing rabbeted portion containing a rubber gasket 42 (Fig. 7) compressible against the inner side face of the rabbet and radially outwardly against the inner wall of the casing by a metal compression ring 43 clamped against the gasket through bolts 44 and nuts 45. While only one of these clamping bolts and nuts appear in the drawing, it is to be understood that there are several of these arranged in a circular series around the mounting rim alternating with the screws 30 which also pass through the rim into threaded engagement with the mounting ring 25.

The rubber window element 35 is mounted on the front of the device by means of the metal window frame 46 in which the window element is secured during the molding of the rubber, as by vulcanizing. The window frame element 46 is secured to the casing through a mounting ring 47 threaded into the front circular open portion of the casing, the frame being secured to the mounting ring through a series of internally-externally threaded bushings 48 and cap screws 49, one pair of which is shown in Fig. 1. A rubber gasket 50 compressed between the mounting ring 47 and the frame element 46, seals the front interior containing the castor oil. A filling opening 52, extending through the window frame and an overlapping portion of the rubber window element, and closed by a suitable, threaded plug 53, permits charging of the front inner space with the oil.

Circuit connections for the field coils 16 and signal coils 21 are omitted from the drawing to avoid confusion, but it is to be understood that these may be made in any known or other suitable manner. Preferably the field coils are connected in series in one circuit and the signal coils in series in another, requiring two pairs, or four circuit leads to be brought out of the device. This is effected through four insulated terminal studs one of which is shown at 51, the four being arranged along a line at right angles to the plane of Fig. 1, as indicated in Figs. 2, 4 and 5. These terminal studs extend through the wall of the casing into a multiple-chambered block 54 (Figs. 4 and 5) of insulating material set in the mounting ring 25. Through the four chambers in this block, and through pairs of registering slots 55 and 56 in the outermost annular pole piece 19 and the wall of the casing, respectively, are passed the four circuit leads, not shown, for connection with the inner ends of the terminal studs, there being a pair of slots 55—56 for each stud 51. The studs pass into the casing through a rubber gasket 57 and metal compression plate 58, the studs being insulated from the casing and the plate 58 by suitable insulation bushings 59 and 60 of synthetic resin. A threaded ground-terminal stud 61 and valve stem 62, threaded into the casing and provided with clamping nuts as shown provide means for compressing the rubber gasket to force it in all directions against its confining members and the several elements passing through it. The valve stem 62 affords fluid connection with the rear interior of the casing permitting the spaces to the rear of the vibrating plate 26 to be filled with some inert gas, for example nitrogen. A deep bushing block 63 of insulating material provides an insulating housing with individual cells, as shown, for the several terminal studs and the valve stem. The cylindrical chamber 64 (Figs. 2, 4 and 5) in the neck of the casing, in which the terminal assemblage just described is housed, is provided with a metal cover plate 65 through which suitable insulated cables 73 may be passed into the well as indicated in Fig. 5, for carrying the various wires, not shown, to be connected to the various terminal lugs. Metal bushings 66 provide extended bearing surfaces for the cables and if desired, the metallic sheathing of the cables may be soldered or otherwise secured to these bushings. To seal the joint between the casing and the cover plate 65, a rubber gasket 67 is fitted within the well between the inner surface of the cover plate and a compression plate 68. A pair of clamping bolts 69 (Fig. 1) threaded into the plate 68 and provided with clamping nuts 70 bearing against the outer face of the cover plate, provide means for compressing the gasket to force it radially against the inner wall of the well and the sides of the bolts and cables.

To guard against a shearing off of the thin flexible portions 31 and 32, upon occurrence of excessive inward pressure on the diaphragm as from underwater explosions, the central spacing disk 24 and mounting ring 25 are provided with stop surface-portions 71 and 72, respectively, lying close to the inside or back face of the diaphragm with a slight clearance sufficient to avoid interference with the normal vibration of the diaphragm.

The several concentric field coil elements 16 are connected in series through suitable current leads which for the sake of clearness are omitted from the drawing but which it will be understood lead through channels 74 (Fig. 4) in the annular core elements 13 and a pair of the slots 55—56 to a pair of the connecting studs 51 for extension of the connection by way of suitable leads in one of the cables 73 to a suitable source of biasing or magnetizing current not shown. Similarly the input-output signal coils 21 are connected in series through suitable current leads, not shown, leading through channels in the core elements 13 and a pair of the slots 55—56 to a pair of the connecting studs 51 for extension of the connection from the outer ends of these studs by way of leads in the other one of the cables 73, for connection to a suitable source of electrical signal energy and a suitable signal receiver.

In operation as a projector, a direct, field-energizing current is fed to the field coils setting up a steady magnetic field in each of the field gaps 20. Upon the passage of alternating currents, from a suitable generator or driver, through the input-output coils 21 acting as input coils, eddy currents are set up in the cylindrical flanges 33 at the back of the zone plate 26. These eddy current flowing in the steady magnetic field of the gaps 20 exert forces in the driving flanges 33 in a direction normal to the surface of the zone plate. With the frequency of the driving, signal currents in coincidence with the mechanical resonant frequency of the vibrating system, sound wave energy in the form of a beam is radiated from the front surface of the zone plate 26 through the castor oil filling the front chamber of the device and through the sound window 35 into the surrounding sea water. Preferably the mechanically resonant system is proportioned and arranged to be very sharply resonant and to make use as effectively as practicable of the forces exerted at the free ends of the driving elements, in developing sound wave pressure at the front or radiating face of the zone plate.

In operation as a receiver the principle of operation is the converse of the above. Plane sound waves propagated toward the device, through the surrounding sea water, and passing through the window element 35 and the castor oil filling the space between the window and the zone plate 26, impinge upon the zone plate, setting up vibrations in the latter and the ends of the cylindrical flanges 33. The motion of the ends of the flanges 33 in their respective magnetic circuit gaps 20 causes eddy currents to flow in the flanges. By induction an electromagnetic force is developed in the closely coupled input-output, signal coils 21, the resulting currents being led off by way of a pair of the terminal studs 51 and one of the cables 73 over suitable circuit leads not shown, to suitable receiving apparatus. If the frequency of the impinging waves coincides with the mechanical resonant frequency of the vibrating member, a relatively large vibrational amplitude is set up in the ends of the flanges 33 and correspondingly a relatively large electromotive force is induced in the signal coils 21.

While but one specific embodiment of the invention has been described herein for the purpose of disclosure, it is to be understood that the invention is not limited to such specific embodiment, but contemplates all such modifications and variations as fall fairly within the scope and preview of the appended claims.

The invention described herein may be manufactured and used by or for the Government of the United States of America for governmental purposes without the payment of any royalties thereon or therefor.

What is claimed is:

1. An electrodynamic transducer comprising a central cylindrical magnetic core element and pole piece therefor, a plurality of annular concentric magnetic core elements and pole pieces therefor concentric with said central element and pole piece to provide a plurality of concentric annular magnetic circuit gaps, a casing formed as one piece with the cores and having a cylindrical side wall extending axially beyond said pole pieces and in part forming the outermost of the concentric core elements, said central core element and pole piece being several times thicker than the annular cores, a relatively thick vibrating diaphragm plate having a central portion rigidly secured to the central core element and pole piece through an intervening disk of nonmagnetic material, said central portion being compliably connected with the remainder of the diaphragm through a relatively thin flexible annular flange portion, a substantially rigid mounting rim for the diaphgram connected with the periphery of the diaphgram through a second relatively thin flexible annular flange and rigidly secured relative to said cylindrical side wall, a plurality of cylindrical flanges of electrical conducting material, one for each said gap, fixed to the diaphragm and extending rearwardly thereof into their respective gaps, energizing windings for said cores, and signal windings mounted in said gaps between said pole pieces and said cylindrical flanges.

2. An electrodynamic transducer comprising a cylindrical casing forming a chamber having a solid back wall and a cylindrical side wall, a central cylindrical magnetic core element and pole piece therefor, a plurality of annular concentric magnetic core elements and pole pieces therefor concentric with said central element and pole piece, a spacing disk of nonmagnetic material fixedly mounted on the central pole piece, a mounting ring fixedly mounted on an extension of the outermost annual core element, a relatively thick vibrating diaphragm plate having a central portion rigidly secured to the spacing disk and compliably connected with the remainder of the diaphragm through an integral relatively thin flexible annular flange portion, a substantially rigid diaphragm mounting rim connected with the periphery of the diaphragm through a second relatively thin flexible annular flange and rigidly secured to the mounting ring, a compressible annular gasket bearing in common against the outer surface of the diaphragm mounting rim and the side wall of the casing outside the rigid connection between the said rim and ring to permit compression of the gasket independently of the rigid connection between rim and ring.

3. An electrodynamic transducer as claimed in claim 2 having stop elements fixed relative to the spacing disk and mounting ring with stop surfaces lying close to but spaced slightly from the back face of the diaphragm along inner and outer annular margins near the flexible flanges to limit back movement of the diaphragm under excessive pressure.

4. An electrodynamic transducer as claimed in claim 2 having the said central portion of the diaphragm plate secured to the spacing disk countersunk to provide a cylindrical chamber opening toward the outer face of the diaphragm, through the bottom wall of which cylindrical chamber clamping screws are passed into threaded engagement with the said spacing disk, and compressible sealing means for sealing off said countersunk chamber compressible independently of the said rigid connection between the central portion of the diaphragm and the spacing disk.

HARVEY C. HAYES.
PRESCOTT N. ARNOLD.

REFERENCES CITED

The following references are of record in the file of this patent:

UNITED STATES PATENTS

| Number | Name | Date |
|---|---|---|
| 2,402,697 | Turner | June 25, 1946 |
| 2,405,185 | Benioff (A) | Aug. 6, 1946 |
| 2,407,329 | Turner | Sept. 10, 1946 |
| 2,451,968 | Murdock | Oct. 19, 1948 |
| 2,473,354 | Benioff (B) | June 14, 1949 |